United States Patent
Chen et al.

(10) Patent No.: US 9,357,269 B2
(45) Date of Patent: May 31, 2016

(54) METHOD AND SYSTEM FOR PROVIDING SECURE HANDLING OF INFORMATION FOR COMPLETE INTERNET ANYWHERE

(75) Inventors: Xuemin Chen, Rancho Santa Fe, CA (US); Marcus Kellerman, San Diego, CA (US); Vladimir Silyaev, Laguna Niguel, CA (US); David Erickson, San Clemente, CA (US)

(73) Assignee: BROADCOM CORPORATION, Irvine, CA (US)

( * ) Notice: Subject to any disclaimer, the term of this patent is extended or adjusted under 35 U.S.C. 154(b) by 811 days.

(21) Appl. No.: 12/650,020

(22) Filed: Dec. 30, 2009

(65) Prior Publication Data

US 2011/0161511 A1   Jun. 30, 2011

Related U.S. Application Data

(60) Provisional application No. 61/261,780, filed on Nov. 17, 2009.

(51) Int. Cl.
*G06F 15/167* (2006.01)
*H04N 21/4782* (2011.01)
(Continued)

(52) U.S. Cl.
CPC ........ *H04N 21/4782* (2013.01); *H04L 63/0209* (2013.01); *H04L 63/0272* (2013.01); *H04N 21/4753* (2013.01); *H04L 9/0838* (2013.01); *H04L 12/2834* (2013.01)

(58) Field of Classification Search
CPC .................................................... H04L 9/0838
USPC .................... 709/214, 229; 370/400
See application file for complete search history.

(56) References Cited

U.S. PATENT DOCUMENTS

| 6,463,445 B1 | 10/2002 | Suzuki |
| 2005/0188086 A1 | 8/2005 | Mighdoll |

(Continued)

FOREIGN PATENT DOCUMENTS

| CN | 101350808 | 1/2009 |
| EP | 2111008 A1 * | 10/2009 | .............. H04L 29/06 |

(Continued)

OTHER PUBLICATIONS

European Patent Office, Communication with Supplementary European Search Report in Application No. 10014463.3, dated Apr. 15, 2011.

(Continued)

*Primary Examiner* — Glenford Madamba
(74) *Attorney, Agent, or Firm* — Foley & Lardner LLP; Christopher J. McKenna; Paul M. H. Pua (57) ABSTRACT

An Internet capable set-top-box (STB) may be operable to extend a security boundary from the Internet capable STB to an application server to allow support of web browsing operations from the application server. A secure link between the Internet capable STB and the application server may be established. The Internet capable STB may communicate a request for web page information from a secure web server along with cryptographic credentials to the application server, via the secure link. The application server may be allowed to receive the web page information directly from the secure web server and process at least the unsupported portion of the received web page information. The Internet capable STB may then receive the web page information with at least the unsupported portion processed from the application server, via the secure link, for further processing and rendering.

20 Claims, 4 Drawing Sheets

(51) Int. Cl.
*H04L 29/06* (2006.01)
*H04N 21/475* (2011.01)
*H04L 9/08* (2006.01)
*H04L 12/28* (2006.01)

(56) References Cited

U.S. PATENT DOCUMENTS

| | | |
|---|---|---|
| 2008/0104520 A1 | 5/2008 | Swenson |
| 2008/0177998 A1* | 7/2008 | Apsangi et al. ............ 713/155 |
| 2008/0195692 A1 | 8/2008 | Hayosh |
| 2009/0019151 A1 | 1/2009 | Stavrakos |
| 2009/0199259 A1* | 8/2009 | Alao et al. ............ 725/147 |
| 2009/0304009 A1* | 12/2009 | Kolhi et al. ............ 370/400 |
| 2010/0299701 A1* | 11/2010 | Liu et al. ............ 725/39 |

FOREIGN PATENT DOCUMENTS

| | | |
|---|---|---|
| EP | 2111008 A1 | 10/2009 |
| WO | WO2009/134586 A2 | 11/2009 |

OTHER PUBLICATIONS

Office Action for Chinese Patent Application No. 201010547792.6 mailed Nov. 2, 2014 (including English summary).

* cited by examiner

METHOD AND SYSTEM FOR PROVIDING SECURE HANDLING OF INFORMATION FOR COMPLETE INTERNET ANYWHERE

This patent application makes reference to, claims priority to, and claims benefit from U.S. Provisional Application Ser. No. 61/261,780, which was filed on Nov. 17, 2009.

CROSS-REFERENCE TO RELATED APPLICATIONS/INCORPORATION BY REFERENCE

This application also makes reference to:
U.S. patent application Ser. No. 12/650,145 which was filed on Dec. 30, 2009;
U.S. patent application Ser. No. 12/650,141 which was filed on Dec. 30, 2009;
U.S. patent application Ser. No. 12/650,140 which was filed on Dec. 30, 2009;
U.S. patent application Ser. No. 12/649,971 which was filed on Dec. 30, 2009;
U.S. patent application Ser. No. 12/650,069 which was filed on Dec. 30, 2009;
U.S. patent application Ser. No. 12/650,067 which was filed on Dec. 30, 2009;
U.S. patent application Ser. No. 12/650,171 which was filed on Dec. 30, 2009; and
U.S. patent application Ser. No. 12/649,998 which was filed on Dec. 30, 2009.

Each of the above stated applications is hereby incorporated herein by reference in its entirety.

FIELD OF THE INVENTION

Certain embodiments of the invention relate to Internet access. More specifically, certain embodiments of the invention relate to a method and system for providing secure handling of information for complete Internet anywhere.

BACKGROUND OF THE INVENTION

With the continuous growth of online businesses, social networks, and other online services and applications, a user may want a larger number of places or locations from which to access the Internet in a manner that is flexible and/or suits the user's lifestyle. Most users currently connect to the Internet using a web browser running on a personal computer. While only a portion of homes have a computer, most homes have a television, and in many instances, multiple televisions. Therefore, rather than using a computer to access the Internet, a user may find it more convenient to use the flat screen televisions and/or display devices in homes for the same purpose. To do so, a set-top-box (STB) connected to, for example, a flat screen television may be provided with web browsing software and protocols, and Internet connectivity, which may enable the user to easily access the Internet and/or check electronic mails (emails), for example, from a convenient and comfortable location such as the living room.

There may be instances, however, in which the STB may not be configured to support and/or capable of processing certain content in a web page. Moreover, there may be instances in which the latency associated with rendering or displaying certain content in a web page may be long because of the processing capabilities of the STB. This may affect the overall experience of the user.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing secure handling of information for complete Internet anywhere, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for providing secure handling of information for complete Internet anywhere. In various embodiments of the invention, an Internet capable set-top-box (STB) may be operable to extend a security boundary from the Internet capable STB to an application server to allow support for secure web browsing operations from the application server. In this regard, the Internet capable STB may be operable to establish a secure link between the Internet capable STB and the application server. The application server and the Internet capable STB may authenticate each other to confirm each other's identity. A cryptography such as, for example, a symmetric-key cryptography, a public-key cryptography and/or a hash function may be utilized to secure the link between the Internet capable STB and the application server.

The Internet capable STB may be operable to communicate a request for web page information from a secure web server along with cryptographic credentials of the Internet capable STB to the application server, via the secure link between the Internet capable STB and the application server. The requested web page information may comprise a supported portion and an unsupported portion where the unsupported potion may comprise, for example, a plug-in and/or multimedia content that is not supported by the Internet capable STB. Accordingly, the application server may be allowed to receive the requested web page information directly from the secure web server which may be accessed via, for example, a hypertext transfer protocol secure (HTTPS) uniform resource locator (URL). The application server may be requested to process at least the unsupported portion of the received web page information. The Internet capable STB may then be operable to receive the web page information with at least the unsupported portion processed from the application server, via the secure link between the Internet capable STB and the application server, for further processing and rendering.

The various embodiments of the invention described herein may be utilized to implement complete Internet anywhere in a home, or a place of work, or a public space, for example, where a user may want to obtain such access to the Internet.

Figure 1:
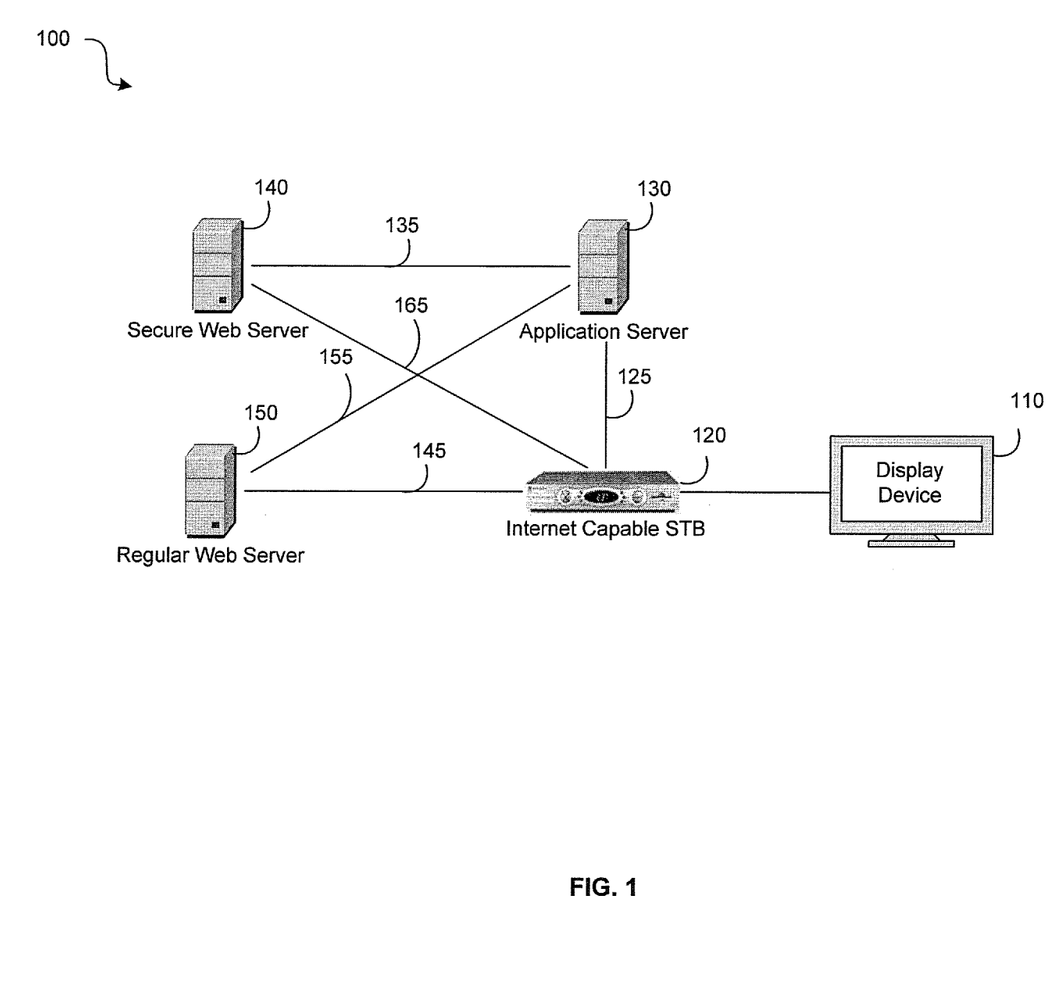
FIG. 1 is a block diagram illustrating an exemplary Internet network that is operable to provide secure handling of information for complete Internet anywhere, in accordance with an embodiment of the invention.

FIG. 1 is a block diagram illustrating an exemplary Internet network that is operable to provide secure handling of information for complete Internet anywhere, in accordance with an embodiment of the invention. Referring to FIG. 1, there is shown an Internet network 100. The Internet network 100 may comprise a display device 110, an Internet capable STB 120, an application server 130, a secure web server 140, a regular web server 150 and links 125, 135, 145, 155 165.

The display device 110 and the Internet capable STB 120 may be located in a home, a business, a school, a library, and/or other like setting in which a user may want to access the Internet and/or check emails. For example, when the location is a home (for example, a house, an apartment), the display device 110 and the Internet capable STB 120 may be located in a bedroom, a family room, or an entertainment room. In another example, when the location is a business or a public building, the display device 110 and the Internet capable STB 120 may be located in a conference room. The application server 130 may be located locally, for example, near the display device 110 and/or the Internet capable STB 120 or may be located remotely, for example, in a server computing cloud. A web server such as, for example, the secure web server 140 and/or the regular web server 150 may be located in the server computing cloud.

The display device 110 may comprise suitable logic, circuitry, interfaces and/or code that may be operable to display or present processed or decoded media content or TV program as well as web page information received from the Internet capable STB 120 to users.

The Internet capable STB 1210 may comprise suitable logic, circuitry, interfaces and/or code that may be operable to connect the display device 110 to an external source of signals and to convert those signals into content that may be displayed on the screen of the display device 110. The STB may be operable to provide processing associated with managing, delivering, and/or storing video content that may be displayed on the display device 110.

The Internet capable STB 120 may also be operable to run a web browser such as, for example, Internet Explorer, Mozilla, Firefox, Apple Safari, Google Chrome and/or Opera to retrieve or present web page information that may be displayed on the screen of the display device 110 for user interaction. The Web page information from a web server such as, for example, the regular web server 150 or the secure web server 140 may comprise an image, audio, video, text, graphics, and/or other type of multimedia content, for example. In instances when a plug-in and/or multimedia content that is unsupported by the Internet capable STB 120 is encountered in the web page information, the application server 130 may be requested by the Internet capable STB 120 to assist with handling, for example, at least the unsupported portion of the web page information. Certain plug-ins may comprise, for example, Flash applications and/or Java applets. In this regard, a secure communication between the Internet capable STB 120, the application server 130 may need to be provided.

The Internet capable STB 120 may be operable to extend a security boundary to the application server 130 to allow web browsing support from the application server 130. A secure link 125 between the Internet capable STB 120 and the application server 130 may be established utilizing, for example, two-way authentication and/or cryptography. The cryptography is a process of converting ordinary information (plaintext) into unintelligible gibberish (i.e., ciphertext) using, for example, an encryption algorithm. The cryptography may comprise, for example, a symmetric-key cryptography, a public-key cryptography and/or a hash function.

In instances when the web page information from the regular web server 150 is requested, the Internet capable STB 120 may receive and process the supported portion of the web page information. In an exemplary embodiment of the invention, the Internet capable STB 120 may request, via the secure link 125, the application server 130 to process at least the unsupported portion of the web page information for rendering.

In instances when the web page information from the secure web server 140 is requested, the Internet capable STB 120 may communicate the request along with corresponding cryptographic credentials to the application server 130, via the secure link 125. Accordingly, the application server 130 may be operable to receive the requested web page information directly from the secure web server 140, via the secure link 135, and process at least the unsupported portion of the web page information. The web page information with at least the unsupported portion processed may then be sent from the application server 130, via the secure link 125, to the Internet capable STB 120. The Internet capable STB 120 may complete the processing of the web page information such as, for example, the supported portion of the web page information and then render the web page information for display on the display device 110.

The application server 130 may comprise suitable logic, circuitry, interfaces and/or code that may be operable to run or execute certain software applications that may be accessible from the Internet capable STB 130, via the secure link 125. In this regard, the application server 130 may be operable to provide support to the web browsing operations provided by the Internet capable STB 130 such as, for example, processing of at least the unsupported portion of the web page information for rendering.

In instances when the web page information from the regular web server 150 is requested, the application server 130 may be operable to receive a request, via the secure link 125, from the Internet capable STB 120 to process at least the unsupported portion of the web page information. In this regard, the processed portion of the web page information may be sent by the application server 130, via the secure link 125, to the Internet capable STB 120 for rendering.

In instances when the web page information from the secure web server 140 is requested, the application server 130 may be operable to receive the web page information from the secure web server 140, directly via the secure link 135, based on the cryptographic credentials that are provided by the Internet capable STB 120, via the secure link 125. The web page information may be processed by the application server 130 for at least the unsupported portion and then sent to the Internet capable STB 120, via the secure link 125, for further processing and rendering.

The secure web server 140 may comprise suitable logic, circuitry, interfaces and/or code that may be operable to deliver to a client, for example, the Internet capable STB 120 secured web page information. The Internet capable STB 120 may request the web page information from the secure web server 140 using, for example, a hypertext transfer protocol secure (HTTPS) uniform resource locator (URL). The HTTPS provides a secure channel or link over the Internet network 100 to ensure reasonable protection from eavesdroppers and/or unwanted man-in-the-middle attacks. The web page information may be delivered, for example, via the secure link 165 to the Internet capable STB 120 for processing and rendering. In an exemplary embodiment of the invention, the secure web server 140 may be operable to deliver the web page information requested by the Internet capable STB 120, via the secure link 135, to the application server 130 for processing of at least the unsupported portion based on cryptographic credentials provided by the Internet capable STB 120.

The regular web server 150 may comprise suitable logic, circuitry, interfaces and/or code that may be operable to deliver to a client, for example, the Internet capable STB 120 web page information. The Internet capable STB 120 may request the web page information from the regular web server 140 using, for example, a hypertext transfer protocol (HTTP) URL. The regular web server 150 may be operable to deliver the web page information requested by the Internet capable STB 120, via the link 145, to the Internet capable STB 120. In an exemplary embodiment of the invention, the regular web server 150 may, for example, deliver at least the unsupported portion of the requested web page information, via the link 155, to the application server 130 for processing of at least the unsupported portion by the application server 130 to support the rendering of the web page information.

In operation, the Internet capable STB 120 may be operable to establish the secure link 125 between the Internet capable STB 120 and the application server 130 utilizing, for example, the two-way authentication and/or the cryptography. In instances when the web page information from the regular web server 150 is requested, the Internet capable STB 120 may receive and process the supported portion of the web page information. The Internet capable STB 120 may request, via the secure link 125, processing of at least the unsupported portion of the web page information by the application server 130. In instances when the web page information from the secure web server 140 is requested, the Internet capable STB 120 may communicate the request along with corresponding cryptographic credentials to the application server 130, via the secure link 125. In this regard, the application server 130 may be operable to receive the requested web page information directly from the secure web server 140, via the secure link 135, and process at least the unsupported portion of the web page information. The web page information, with at least the unsupported portion processed, may then be sent from the application server 130, via the secure link 125, to the Internet capable STB 120. The Internet capable STB 120 may complete the processing of the web page information such as, for example, the supported portion of the web page information and then render the web page information for presentation on the display device 110.

Although the Internet capable STB 120 is illustrated in FIG. 1 for full Internet experience, the invention may not be so limited. Accordingly, instead of the Internet capable STB 120, the display device 110 itself with a broadband connection capability for full Internet experience may be supported without departing from the spirit and scope of various embodiments of the invention.

Figure 2:
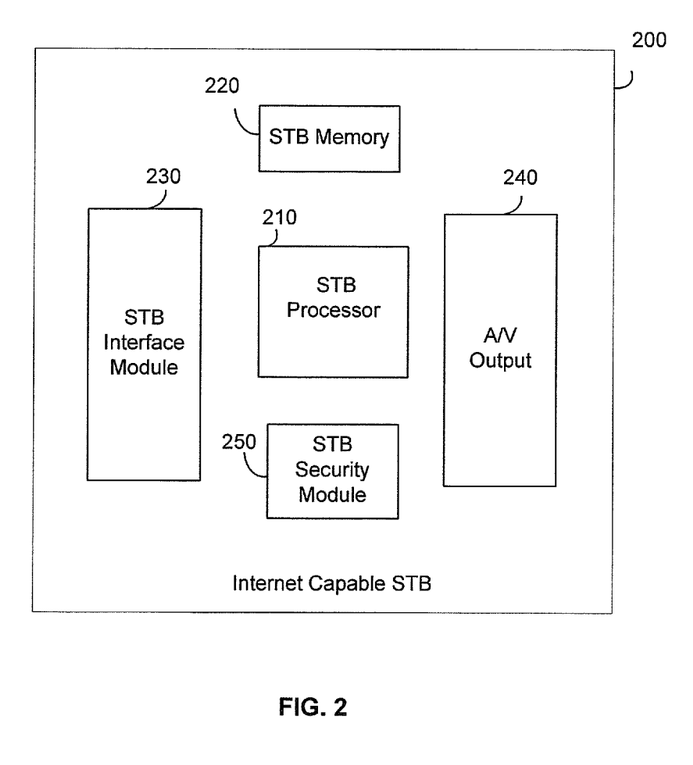
FIG. 2 is a block diagram illustrating an exemplary Internet capable STB that is operable to provide secure handling of information for complete Internet anywhere, in accordance with an embodiment of the invention.

FIG. 2 is a block diagram illustrating an exemplary Internet capable STB that is operable to provide secure handling of information for complete Internet anywhere, in accordance with an embodiment of the invention. Referring to FIG. 2, there is shown an Internet capable STB 200. The Internet capable STB 200 may comprise a STB processor 210, a STB memory 220, a STB interface module 230, an A/V output 240 and a STB security module 250.

The STB processor 210 may comprise suitable logic, circuitry, interfaces and/or code that may be operable to provide processing associated with managing, delivering, and/or storing video content that may be displayed on, for example, the display device 110 described above. The STB processor 210 may also be operable to run or execute a web browser to retrieve or present web page information that may be displayed on the screen of the display device 110 for user interaction.

In instances when the web page information from the regular web server 150 is requested, the STB processor 210 may receive and process the supported portion of the web page information. The STB processor 210 may request, for example, via the secure link 125, the application server 130 to process at least the unsupported portion of the web page information for rendering.

In instances when the web page information from the secure web server 140 described above is requested, the STB processor 210 may communicate the request along with corresponding cryptographic credentials to the application server 130, via the secure link 125. Accordingly, the application server 130 may be operable to receive the requested web page information directly from the secure web server 140, via the secure link 135, and process at least the unsupported portion of the web page information. After receiving the web page information with at least the unsupported portion processed from the application server 130, via the secure link 125, the STB processor 210 may complete the processing of the web page information such as, for example, the supported portion of the web page information. The STB processor 210 may then render the web page information for display on the display device 110 through the A/V output 240.

The STB memory 220 may comprise suitable logic, circuitry, interfaces and/or code that may be operable to store information associated with the operation of the STB processor 210.

The STB interface module 230 may comprise suitable logic, circuitry, interfaces and/or code that may enable the Internet capable STB 200 to interface with a plurality of devices, including, for example, the application server 130 and/or the regular web server 140 described above. The STB interface module 230 may support connections with cable TV services and/or satellite services. The STB interface module 230 may support multiple ports such as High-Definition Multimedia Interface (HDMI), Ethernet Physical Layer (PHY), Universal Serial Bus (USB), and RS232, for example. Other types of connections, protocols, and/or ports may also be supported. The STB interface module 230 may support communication with the application server 130 via the secure link 125 and/or with the regular web server 150 via the link 145, for example.

The A/V output 240 may comprise suitable logic, circuitry, interfaces and/or code that may be operable to provide audio and/or video content for display or reproduction to, for example, the display device 110 described above. In this regard, the A/V output 240 may support multiple technical standards such as DTV, HDTV, and/or multiple screen resolutions.

The STB security module 250 may comprise suitable logic, circuitry, interfaces and/or code that may be operable to support authentication operations, credential usage and/or cryptographic operations that may be utilized to provide a secure connection such as the secure link 125 described above between the Internet capable STB 200 and an application server such as the application server 130 described above.

The STB security module 250 may communicate corresponding cryptographic credentials of the Internet capable STB 200 to the application server 130, via the secure link 125.

In operation, the STB processor 210 may be operable to run or execute a web browser to retrieve or present web page information that may be displayed on the screen of the display device 110 for user interaction. The STB security module 250 may be operable to establish the secure link 125 between the Internet capable STB 200 and the application server 130 utilizing, for example, the two-way authentication and/or the cryptography.

In instances when the web page information from the regular web server 150 is requested, the STB processor 210 may receive and process the supported portion of the web page information. The STB processor 210 may request, for example, via the secure link 125, the application server 130 to process at least the unsupported portion of the web page information for rendering.

In instances when the web page information from the secure web server 140 is requested, the STB processor 210 may work with the STB security module 250 to communicate the request along with corresponding cryptographic credentials to the application server 130, via the secure link 125. In this regard, the application server 130 may be operable to receive the requested web page information directly from the secure web server 140, via the secure link 135, and process at least the unsupported portion of the web page information. After receiving the web page information from the application server 130, via the secure link 125, with at least the unsupported portion processed, the STB processor 210 may complete the processing of the web page information such as, for example, the supported portion of the web page information. The STB processor 210 may then render the web page information for display or presentation on the display device 110 through the A/V output 240.

Figure 3:
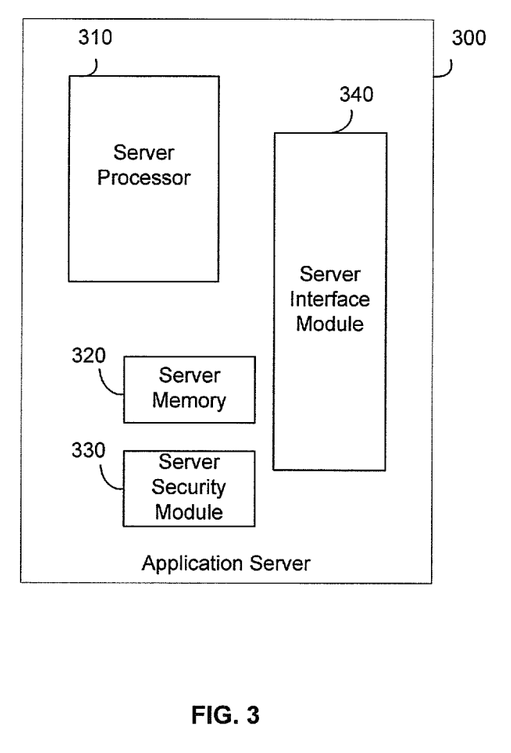
FIG. 3 is a block diagram illustrating an exemplary application server that is operable to support secure handling of information for complete Internet anywhere, in accordance with an embodiment of the invention.

FIG. 3 is a block diagram illustrating an exemplary application server that is operable to support secure handling of information for complete Internet anywhere, in accordance with an embodiment of the invention. Referring to FIG. 3, there is shown an application server 300. The application server 300 may comprise a server processor 310, a server memory 320, a server security module 330 and a server interface module 340.

The server processor 310 may comprise suitable logic, circuitry, interfaces and/or code that may be operable to process requests from a STB such as the Internet capable STB 120 described above to handle at least a portion of web page information for subsequent rendering by the Internet capable STB 120. In this regard, the server processor 310 may be operable to convert and/or transcode content of the web page information from one format into another format. For example, the server processor 310 may be operable to process plug-ins unsupported by the web browser in the Internet capable STB 120 and may encode such processed plug-ins with a low latency H.264/ACC encoder. The server processor 310 may comprise a plurality of different encoders that may be utilized to encode different types of contents from a web page into different formats, for example.

In some embodiments of the invention, the server processor 310 may comprise an x86-based architecture that may support processing of, for example, certain plug-ins developed or coded for execution in an x86-based processor architecture. In other embodiments, the server processor 310 may be operable to provide an emulator of the x86-based processor to process certain content unsupported by the Internet capable STB 120.

In instances when the web page information from the regular web server 150 described above is requested by a STB such as the Internet capable STB 120 described above, the server processor 310 may receive a request, via a secure link such as the secure link 125, from the Internet capable STB 120 to process at least the unsupported portion of the web page information. In this regard, the processed portion of the web page information may be sent by the server processor 310, via the secure link 125, to the Internet capable STB 120 for rendering.

In instances when the web page information from the secure web server 140 is requested by the Internet capable STB 120, the server processor 310 may be operable to receive the web page information from the secure web server 140 directly, via the secure link 135, based on corresponding cryptographic credentials received by the server security module 330 from the Internet capable STB 120, via the secure link 125. The web page information may be processed by the server processor 310 for at least the unsupported portion and then sent to the Internet capable STB 120, via the secure link 125, for further processing and rendering.

The server memory 320 may comprise suitable logic, circuitry, interfaces and/or code that may be operable to store information associated with the operation of the server processor 310. The server memory 320 may be operable to store information (for example, coefficients, tables) associated with the encoding operations supported by the server processor 310.

The server security module 330 may comprise suitable logic, circuitry, interfaces and/or code that may be operable to support authentication operations, credential usage, and/or cryptographic operations that may be utilized to provide a secure connection such as the secure link 125 described above between the server 300 and a STB such as the Internet capable STB 120 described above, for example. The server security module 330 may receive corresponding cryptographic credentials from the Internet capable STB 120. The server security module 330 may then present the cryptographic credentials to a secure web server such as the secure web server 140 for supporting the web browsing operations requested by the Internet capable STB 120.

The server interface module 340 may comprise suitable logic, circuitry, interfaces and/or code that may be operable to enable the server 300 to communicate with a STB such as the Internet capable STB 120 and/or with a web server such as the regular web server 150 or the secure web server 140 from which to obtain web page information, for example. The server interface module 340 may support a plurality of physical and/or logical connections or interfaces. The server interface module 140 may support communication with the Internet capable STB 120 via the secure link 125, with the regular web server 150 via the link 155 and/or with the secure web server 140 via the secure link 135, for example.

In operation, the server processor 310 may be operable to process requests from the Internet capable STB 120 to handle at least a portion of web page information for subsequent rendering by the Internet capable STB 120. The server security module 330 may be operable to establish the secure link 125 between the application server 300 and the Internet capable STB 120 utilizing, for example, the two-way authentication and/or the cryptography.

In instances when the web page information from the regular web server 150 is requested by the Internet capable STB 120, the server processor 310 may receive a request, via the secure link 125, from the Internet capable STB 120 to process at least the unsupported portion of the web page information. The processed portion of the web page information may then be sent by the server processor 310, via the secure link 125, to the Internet capable STB 120 for rendering.

In instances when the web page information from the secure web server 140 is requested by the Internet capable STB 120, the server processor 310 may be operable to receive the web page information from the secure web server 140 directly, via the secure link 135, based on corresponding cryptographic credentials that are received by the server security module 330 from the Internet capable STB 120, via the secure link 125. The web page information may be processed by the server processor 310 for at least the unsupported portion and then sent to the Internet capable STB 120, via the secure link 125, for further processing and rendering.

Figure 4:
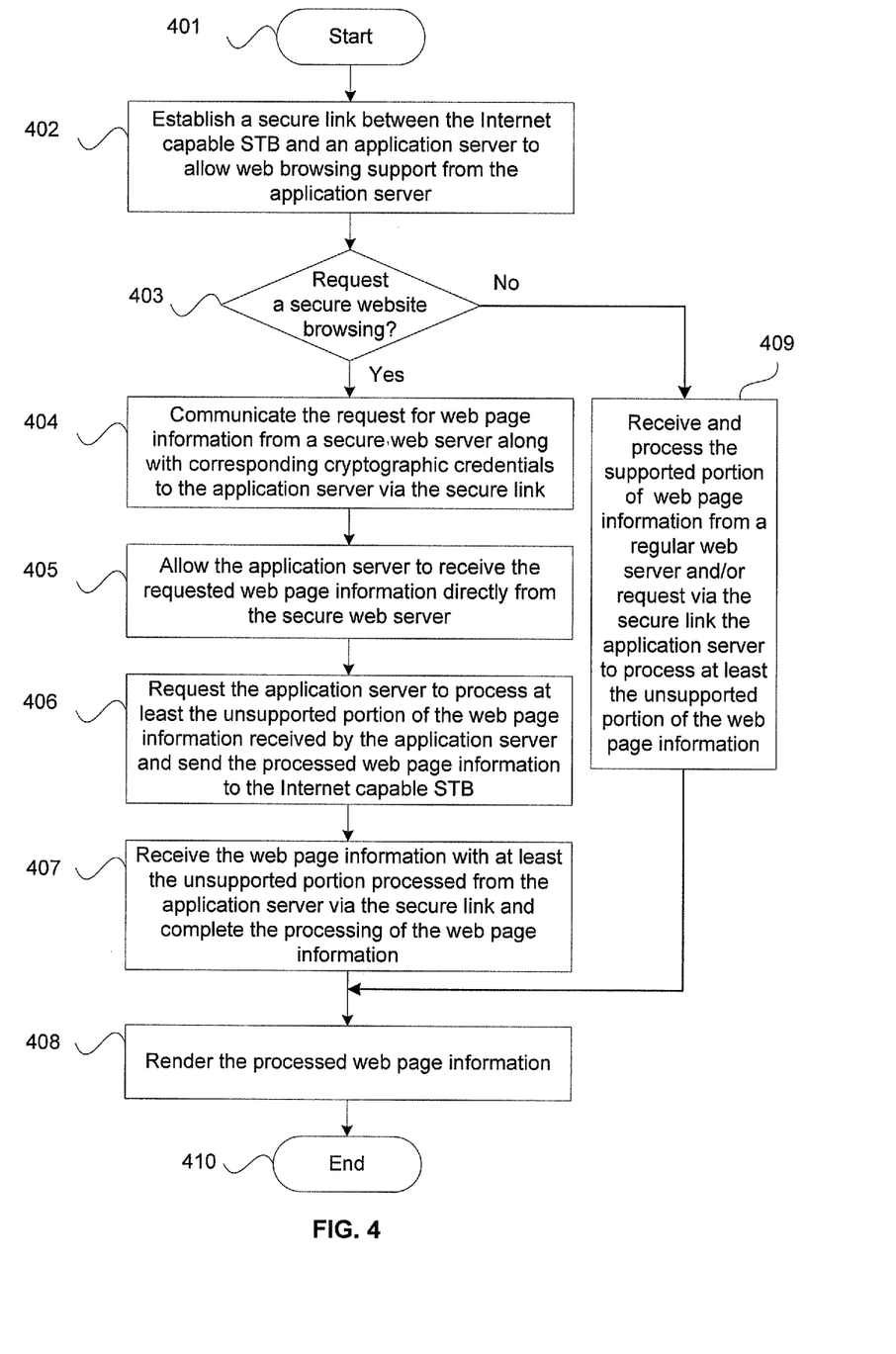
FIG. 4 is a flow chart illustrating exemplary steps for secure handling of information for complete Internet anywhere, in accordance with an embodiment of the invention.

FIG. 4 is a flow chart illustrating exemplary steps for secure handling of information for complete Internet anywhere, in accordance with an embodiment of the invention. Referring to FIG. 4, the exemplary steps start at step 401. In step 402, the Internet capable STB 120 may be operable to establish a secure link 125 between the Internet capable STB 120 and an server 130 to allow web browsing support from the application server 130. In step 403, a request for a secure website browsing is checked. In instances when a secure website browsing is requested, the exemplary steps may proceed to step 404. In step 404, the Internet capable STB 120 may be operable to communicate the request for web page information from a secure web server 140 along with corresponding cryptographic credentials to the server 130, via the secure link 125. In step 405, the application server 130 may be allowed to receive the requested web page information directly from the secure web server 140. In step 406, the application server 130 may be operable to process at least the unsupported portion of the web page information received by the application server 130 and send the processed web page information to the Internet capable STB 120. In step 407, the Internet capable STB 120 may be operable to receive the web page information, with at least the unsupported portion processed, from the application server 130, via the secure link 125, and complete the processing of the web page information. In step 408, the processed web page information may be rendered by the Internet capable STB 120. The exemplary steps may proceed to the end step 410. In step 403, in instances when a secure website browsing is not requested, the exemplary steps may proceed to step 409. In step 409, the Internet capable STB 120 may be operable to receive and process the supported portion of web page information from a regular web server 150 and/or request, via the secure link 125, the server 130 to process at least the unsupported portion of the web page information. The exemplary steps may proceed to step 408.

In various embodiments of the invention, an Internet capable STB 120 may be operable to extend a security boundary from the Internet capable STB 120 to an application server 130 to allow support for secure web browsing operations from the application server 130. In this regard, the Internet capable STB 120 may be operable to establish a secure link 125 between the Internet capable STB 120 and the application server 130. The application server 130 and the Internet capable STB 120 may authenticate each other to confirm each other's identity. A cryptography operation such as, for example, a symmetric-key cryptography, a public-key cryptography and/or a hash function may be utilized to secure the link 125 between the Internet capable STB 120 and the application server 130.

The Internet capable STB 120 may be operable to communicate a request for web page information from a secure web server 140 along with corresponding cryptographic credentials of the Internet capable STB 120 to the application server 130, via the secure link 125 between the Internet capable STB 120 and the application server 130. The requested web page information may comprise a supported portion and an unsupported portion where the unsupported portion may comprise, for example, a plug-in and/or multimedia content that is not supported by the Internet capable STB 120. Accordingly, the application server 130 may be allowed to receive the requested web page information directly from the secure web server 140. The application server 130 may be requested to process at least the unsupported portion of the received web page information. The Internet capable STB 120 may then be operable to receive the web page information with at least the unsupported portion processed from the application server 130, via the secure link 125 between the Internet capable STB 120 and the application server 130, for further processing and rendering.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for providing secure handling of information for complete Internet anywhere.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for securing Internet connection, the method comprising:
performing by one or more processors and/or circuits in an Internet capable set-top-box (STB):
extending a security boundary from said Internet capable STB to an application server to allow support for secure web browsing operations from said application server, comprising establishing a secure link using at least one of public-key cryptography or a hash function between said Internet capable STB and said application server, and sending cryptographic credentials of said Internet capable STB and a request for web page information via said established secure link to the application server, wherein:

said secure web browsing operations comprise receiving said requested web page information by said application server from a secure web server using said cryptographic credentials of said Internet capable STB, and processing by said application server an unsupported portion of said web page information, said received web page information comprising a supported portion for processing by said Internet capable STB; and said cryptographic credentials are transmitted to said secure web server via said application server via said secure link between said Internet capable STB and said application server, said security boundary extended by establishing said secure link prior to communicating said cryptographic credentials to said secure web server.

2. The method according to claim 1, comprising establishing said secure link between said Internet capable STB and said application server using at least one of two-way authentication or cryptography.

3. The method according to claim 1, wherein said Internet capable STB and said application server authenticate each other to confirm each other's identity.

4. The method according to claim 1, comprising securing said secure link between said Internet capable STB and said application server utilizing a cryptography.

5. The method according to claim 1, comprising rendering said web page information with at least said unsupported portion processed, on a browser of said Internet capable STB.

6. The method according to claim 1, comprising communicating said request for said web page information to include a request to the application server to process said unsupported portion of said web page information.

7. The method according to claim 1, wherein said unsupported portion of said web page information comprises a plug-in and/or multimedia content that is unsupported by said Internet capable STB.

8. The method according to claim 6, wherein said application server presents said request and said cryptographic credentials of said Internet capable STB to said secure web server, and receives said requested web page information directly from said secure web server based on said presented cryptographic credentials of said Internet capable STB.

9. The method according to claim 1, comprising receiving said supported portion from said application server via said secure link for further processing and rendering.

10. The method according to claim 1, comprising receiving said web page information with at least said unsupported portion processed from said application server via said secure link for further processing and rendering.

11. A system for securing Internet connection, the system comprising:

one or more hardware processors and/or circuits for use in an Internet capable set-top-box (STB), wherein said one or more hardware processors and/or circuits are configured to:

extend a security boundary from said Internet capable STB to an application server to allow support for secure web browsing operations from said application server, comprising establishing a secure link using at least one of public-key cryptography or a hash function between said Internet capable STB and said application server, and sending cryptographic credentials of said Internet capable STB and a request for web page information via said established secure link to said application server, wherein:

said secure web browsing operations comprise receiving said requested web page information by said application server from a secure web server using said cryptographic credentials of said Internet capable STB, and processing by said application server an unsupported portion of said web page information, said received web page information comprising a supported portion for processing by said Internet capable STB; and said cryptographic credentials are transmitted to said secure web server via said application server via said secure link between said Internet capable STB and said application server, said security boundary extended by establishing said secure link prior to communicating said cryptographic credentials to said secure web server.

12. The system according to claim 11, wherein said one or more hardware processors and/or circuits are configured to establish said secure link between said Internet capable STB and said application server using at least one of two-way authentication or cryptography.

13. The system according to claim 11, wherein said Internet capable STB and said application server are configured to authenticate each other to confirm each other's identity.

14. The system according to claim 11, wherein said one or more hardware processors and/or circuits are configured to secure said secure link between said Internet capable STB and said application server utilizing a cryptography.

15. The system according to claim 11, wherein said one or more hardware processors and/or circuits are configured to communicate said request for said web page information to include a request to the application server to process said unsupported portion of said web page information.

16. The system according to claim 11, wherein said unsupported portion of said web page information comprises a plug-in and/or multimedia content that is unsupported by said Internet capable STB.

17. The system according to claim 15, wherein said application server is configured to present said request and said cryptographic credentials of said Internet capable STB to said secure web server, and receive said requested web page information directly from said secure web server based on said presented cryptographic credentials of said Internet capable STB.

18. The system according to claim 11, wherein said one or more hardware processors and/or circuits are configured to receive said supported portion from said application server via said secure link for further processing and rendering.

19. The system according to claim 11, wherein said one or more hardware processors and/or circuits are configured to receive said web page information with at least said unsupported portion processed from said application server via said secure link for further processing and rendering.

20. A method for securing Internet connection, the method comprising: in an Internet capable set-top-box (STB):

extending a security boundary from said Internet capable STB to an application server, via a secure link between said Internet capable STB and said application server, to allow support for secure web browsing operations from said application server, comprising establishing a secure link using at least one of public-key cryptography or a hash function between said Internet capable STB and said application server, and sending cryptographic credentials of said Internet capable STB and a request for web page information via said established secure link to the application server, wherein:

said secure web browsing operations comprise receiving said requested web page information by said application server from a secure web server using said cryptographic credentials of said Internet capable STB, and processing by said application server an unsupported portion of said web page information, said received web page information comprising a supported portion for processing by said Internet capable STB; and said cryptographic credentials are transmitted to said secure web server via said application server via said secure link between said Internet capable STB and said application server, said security boundary extended by establishing said secure link prior to communicating said cryptographic credentials to said secure web server.

* * * * *